United States Patent
Winkler et al.

(10) Patent No.: US 9,486,866 B2
(45) Date of Patent: Nov. 8, 2016

(54) POWER TOOL

(71) Applicant: Robert Bosch GmbH, Stuttgart (DE)

(72) Inventors: Thomas Winkler, Stuttgart (DE);
Helge Sprenger, Stuttgart (DE); Peter Schwenkel, Dettingen an der Erms (DE); Richard Schoenleber, Stuttgart (DE); David Gaenzle, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 92 days.

(21) Appl. No.: 14/502,145

(22) Filed: Sep. 30, 2014

(65) Prior Publication Data
US 2015/0090086 A1   Apr. 2, 2015

(30) Foreign Application Priority Data

Sep. 30, 2013 (DE) ........................ 10 2013 219 764

(51) Int. Cl.
| B23D 51/16 | (2006.01) |
| B23D 51/18 | (2006.01) |
| B23D 47/12 | (2006.01) |
| B23D 55/06 | (2006.01) |
| B27B 17/08 | (2006.01) |

(52) U.S. Cl.
CPC ............. B23D 51/18 (2013.01); B23D 47/123 (2013.01); B23D 51/163 (2013.01); B23D 55/06 (2013.01); B27B 17/08 (2013.01); *Y10T 83/04* (2015.04); *Y10T 83/687* (2015.04)

(58) Field of Classification Search
CPC .... B23D 51/18; B23D 47/123; B23D 55/06; B23D 51/163; B27B 17/08; Y10T 83/687; Y10T 83/04
See application file for complete search history.

(56) References Cited

U.S. PATENT DOCUMENTS

| 2,968,269 | A * | 1/1961 | Smith | D05B 65/00 |
| | | | | 112/253 |
| 3,064,698 | A * | 11/1962 | La Force | B23D 51/025 |
| | | | | 83/746 |
| 3,599,523 | A * | 8/1971 | Pickett | G01N 1/06 |
| | | | | 83/412 |
| 4,977,802 | A * | 12/1990 | Kirbach | B23D 47/005 |
| | | | | 83/13 |
| 4,979,305 | A * | 12/1990 | Leini | B23D 49/006 |
| | | | | 30/369 |
| 5,115,567 | A * | 5/1992 | Yang | A61F 15/02 |
| | | | | 30/166.3 |
| 5,349,754 | A * | 9/1994 | Wuensch | B23D 49/006 |
| | | | | 30/369 |
| 5,473,820 | A * | 12/1995 | Neubert | B23D 49/006 |
| | | | | 30/369 |
| 5,927,174 | A * | 7/1999 | Newnes | B27B 5/34 |
| | | | | 83/13 |
| 2004/0031366 | A1* | 2/2004 | Huang | B23D 51/02 |
| | | | | 83/454 |
| 2006/0123959 | A1* | 6/2006 | Bocast | A61B 17/14 |
| | | | | 83/13 |
| 2010/0288098 | A1* | 11/2010 | Matsuura | B23D 47/123 |
| | | | | 83/830 |
| 2011/0126814 | A1* | 6/2011 | Nishino | B23D 55/06 |
| | | | | 125/21 |

FOREIGN PATENT DOCUMENTS

| AT | 290097 B | 5/1971 |
| DE | 10 2006 007 616 A1 | 8/2007 |
| DE | 10 2011 077 900 A1 | 12/2012 |

\* cited by examiner

*Primary Examiner* — Sean Michalski
(74) *Attorney, Agent, or Firm* — Maginot, Moore & Beck LLP

(57) ABSTRACT

A power tool includes a sawing working device of an at least partially flat form and at least one actuator. The sawing working device is configured to produce a sawing cut in a working direction. The at least one actuator is configured to produce at least one oscillation in the sawing working device.

20 Claims, 8 Drawing Sheets

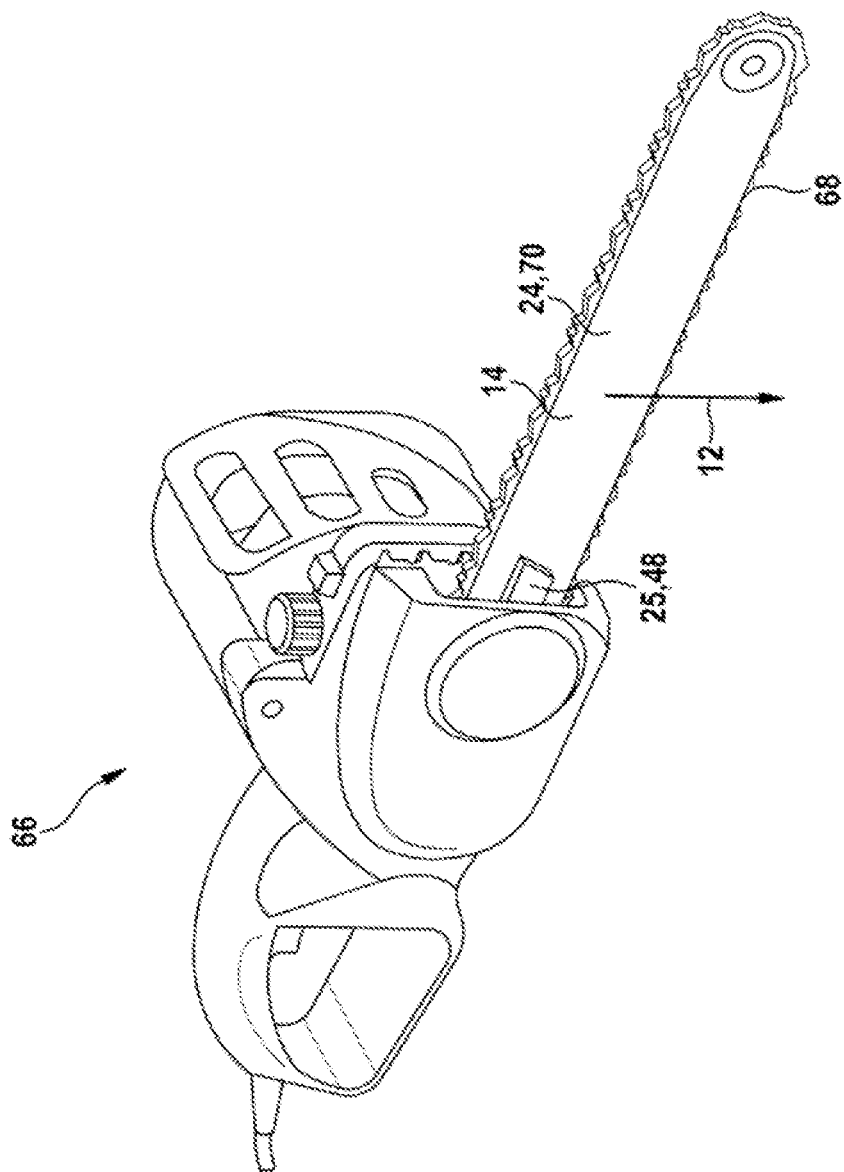

POWER TOOL

This application claims priority under 35 U.S.C. §119 to patent application no. DE 10 2013 219 764.0, filed on Sep. 30, 2013 in Germany, the disclosure of which is incorporated herein by reference in its entirety.

BACKGROUND

The disclosure is based on a power tool with a sawing working means of an at least partially flat form, for producing a sawing cut in a working direction, and an actuator.

DE 10 2011 077 900 discloses a power tool, in particular a reciprocating saw, with a sawing working means of an at least partially flat form, for producing a sawing cut in a working direction. In an operating mode, the working means, which is fastened at least in a working means holder of a reciprocating unit, is driven by an actuator and, along with its primary reciprocating and swinging movement, is moved in an oscillating manner about its reciprocating axis. As a result, a sawing gap produced in the workpiece during the sawing is increased. This allows for example jamming of the working means in the sawing gap to be prevented. Moreover, it preferably allows a sawing cut with a narrow radius to be produced in a workpiece, for example for sawing out a segment of a circle.

SUMMARY

According to the disclosure, it is proposed that the at least one actuator is provided for producing at least one oscillation in the working means. "Provided" should be understood as meaning in particular especially designed and/or especially equipped. That an actuator is provided for producing an oscillation should be understood as meaning in particular that the actuator brings about the production of the oscillation in at least one application state or operating state of the power tool. Consequently, the actuator excites the sawing working means in such a way that, in an application state and/or operating state, an oscillation forms in the working means. This oscillation preferably occurs concurrently with the primary sawing movement of the working means. For this purpose, an actuator acts at least indirectly on the sawing working means. Typically, the actuator is fastened to the power tool or the working means. The actuator may for example be fastened to and/or supported on a power tool housing or a footplate. Moreover, the actuator may act at least indirectly on a drive unit or a drive force transmission mechanism of the power tool. The actuator may preferably act at least indirectly on the working means by way of a holder and/or guide and/or drive unit of the working means. By the actuator exciting this holder and/or guide and/or drive unit, it induces the working means to perform at least an oscillation occurring concurrently with the primary sawing movement and/or a concurrently occurring oscillating movement.

A "sawing" working means should be understood as meaning a tool, preferably a saw blade or sawing band, in particular a reciprocating saw blade or circular saw blade or a band saw blade. Particularly preferably, it is a jigsaw blade or saber saw blade. However, it is also conceivable that the sawing working means is a chain, for example a chainsaw, or some other sawing working means that appears appropriate to a person skilled in the art. Preferably, cutting tools of a flat form should be considered as sawing working means. A cutting tool of a flat form should be understood as meaning a cutting tool that has the three dimensions, length, width and depth or wall thickness, the depth or wall thickness being very much smaller in comparison with the length and width. A cutting tool of a flat form should also be understood as meaning a cutting tool that has a diameter or radius and a depth or wall thickness, the depth or wall thickness being very much smaller in comparison with the diameter or radius. Very much smaller should define here a factor of at least greater than five, preferably greater than ten.

The working means is driven by at least one drive unit, or a drive train. Preferably, the drive train comprises an electric motor as the drive unit and a drive force transmission mechanism, which in turn drives the working means at least indirectly. The electric motor may in this case be grid-powered or battery-powered. However, a pneumatically and/or hydraulically driven drive unit is also conceivable. In the case of a reciprocating saw, the drive power transmission mechanism is typically a gear mechanism and/or a reciprocating unit. However, it is also conceivable that the drive means is driven by the drive unit directly. The drive means may typically be held and driven by a drive means arresting device in connection at least with the drive unit, preferably with the drive force transmission mechanism. In the case of a jigsaw, saber saw, circular saw, band saw or chainsaw for example, the working means is typically moved at least in a translatory, oscillating or rotary manner. In addition, in the case of a jigsaw or saber saw, for example, a swinging movement, typically swinging in a working direction, may occur concurrently with an oscillating reciprocating movement of the working means. The swinging intensity can be chosen, typically adjustably by a user, and/or can be controlled by an automatic system of the power tool.

A "working means of an at least partially flat form" should be understood as typically meaning a flat-formed, at least elongate or annular working means. It is consequently a working means that typically assumes a much greater value in the two dimensions of length and width than in the third dimension of wall thickness or thickness or depth of the working means. However, the working means may also be a sawing chain that is guided on a bar-like working means guide. In this case, the complete unit comprising the sawing chain and the bar-like working means guide should be considered as a working means of a flat form. The working means generally consists of steel or a steel alloy. However, it may for example also be formed by a composite material or a ceramic compound and/or else be coated, hardened or tipped in a diamond-like manner, in particular at the sawing locations. The working means may be made up of one or more pieces. On a side facing in a working direction and/or on the circumference, the working means typically has bit-like cutting edges or elements. These cutting edges or elements typically lift off chips from a workpiece during a machining movement. A machining movement should be understood as meaning the combination of an advancing movement and a cutting movement. For example, in the case of a jigsaw, disregarding the swing, the cutting movement is formed by the tool oscillating back and forth, and the advancing movement may be produced by the user, as moving the power tool in a working direction. A parting line, the "sawing cut" or sawing gap guides, is thereby produced in the workpiece in the working direction by the sawing working means. A sawing cut is thus produced in the workpiece in the working direction during sawing. The workpiece preferably consists of a solid material, particularly preferably of plastic or metal and most particularly preferably of wood, a wood-fiber composite material or wood-fiber material.

For producing at least one oscillation in the working means, according to the disclosure an actuator is provided. "Producing" should be understood here as meaning a specific, generally periodic, excitation of the working means. The periodic excitation typically takes place at at least one self-oscillating frequency of the respective working means. The excitation is preferably adjustable in its intensity. Accordingly, the excitation preferably leads to a "specific" oscillation in the working means. It is specific because it can be assumed that oscillations are likewise produced in the working means by the machining by sawing itself. However, by contrast with the specifically excited oscillations, these oscillations are of an unspecific or spontaneous character. A specific excitation of the oscillation by means of an actuator also means that the desired oscillation can be maintained over an oscillation-damping effect of the workpiece to be sawn on the working means. Consequently, a desired oscillation can be induced in the working means, maintained and, if appropriate, chosen in its intensity in an adjustable manner by means of the actuator. Specific oscillations in the working means may preferably be at least an intensification of transversal fundamental-mode and/or harmonic oscillations of the working means. In an advantageous way, this allows at least an oscillation that typically forms constantly over the working means, in particular a standing wave, to form in the working means with relatively little input or expenditure of energy.

Consequently, the specifically oscillating movement of the working means may occur concurrently with the primarily sawing movement. The specifically concurrently occurring oscillation in the working means allows a cutting width to be set or varied and/or adapted for example with respect to a working means width serving as a reference value. Preferably, the cutting width may consequently be adjusted and/or adapted according to the requirements of the user. Particularly preferably, the cutting width may be chosen to be slightly greater with respect to a tool width, at least in relative terms, than in the case of machining purely by sawing without a specific oscillation or specific production of an oscillation in the working means. This advantageously allows the ease-off of the tool in the workpiece to be increased. As a result of the increased cutting width, undesired friction of the working means of an at least partially flat form on the lateral faces of the workpiece is reduced. Heat input into the working means and/or the workpiece is lessened. The tendency of the blade to become jammed in the workpiece is reduced. This advantageously allows the driving force and cutting force to be reduced.

Particularly advantageous, for example when sawing with a jigsaw, is the avoidance of undesired misaligned running of the saw blade, which may occur in particular in the case where thick workpieces are machined with flexible saw blades, at least without concurrently occurring specific oscillation. The specifically introduced oscillation in the working means has the effect according to the disclosure that the design strength of the working means, i.e. the stiffness thereof with respect to externally applied loads such as torsion or bending, can be increased. This can be achieved in particular by a standing wave forming in the working means. Advantageously, the quality of the cut during machining by sawing can be improved in this way.

Moreover, an oscillation in the working means that can be introduced in a specifically adjustable manner, in particular by way of the amplitude and frequency of the oscillation, allows a cutting width to be varied. Advantageously, different cutting widths, cutting qualities and an ease-off of the working means in the workpiece can in this way be changed by a working means, in particular changed in an adjustable manner.

Moreover, tearing out of material at the surface of the workpiece can also be reduced and or avoided. This may otherwise occur frequently, for example when there is increased friction between the working means and the workpiece, or a small ease-off of the sawing working means in the workpiece.

Advantageous developments of the power tool according to the disclosure are provided by the features of the dependent claims.

It is proposed that, in an advantageous embodiment, the at least one actuator may be provided for producing transversal forms of oscillation, in particular transversal waves, in the working means. Transversal forms of oscillation are waves where an oscillation takes place transversely in relation to the direction of propagation of the wave. The propagation typically emanates from a source of excitation, preferably the point of action and/or point of engagement of the at least indirectly acting actuator. Particularly preferably, these forms of oscillation propagate in the working means from a working means holder of the power tool, at least indirectly excited by the actuator, in the direction of a free end of the working means. Depending on the working means, the direction of propagation of the transversal forms of oscillation takes place in the longitudinal and/or circumferential direction. For example, in the case of a jigsaw, saber saw, band saw or chainsaw in the longitudinal direction, in the case of a circular saw in the circumferential or rotational direction of the working means. However, it is also conceivable that, in the case of a circular saw, the propagation of the oscillation takes place in a radial direction or in a radial direction and circumferential direction concurrently.

Preferably, the transversal forms of oscillation in the working means are excited directly underneath or above, or close to the machining location of the workpiece to be machined by means of an actuator attached at least indirectly to a working means guiding device. Underneath or above or close to the machining location of the workpiece to be machined indicates here the region of the working means that at least directly surrounds the engaged, sawing portion of the working means. In an advantageous way, this allows a specific oscillation, influencing the amplitude and frequency, to be set, in particular in the case of a band saw.

Moreover, in particular in conjunction with a sensor monitoring the oscillation and preferably by means of a sensor-fed controller in connection with the actuator, an excitation of an oscillation that is set suitably in its intensity for the workpiece to be machined and/or the working means can take place. In an advantageous way, this allows the sawing result to be improved, wearing of the working means and/or the power tool to be reduced and the safety of the work to be increased.

Furthermore, it is proposed that the at least one actuator can produce oscillations or forms of oscillation in the working means transversely in relation to the working direction of the working means. "Transversely in relation to the working direction" means transversely in relation to the parting line produced in the workpiece by the machining by sawing or transversely in relation to the sawing cut and/or the sawing gap. The actuator preferably acts on the side of a flat form of the working means. The side of a flat form of the working means is defined by the long side and broad side of the working means, or the circular area of a circular saw blade. The working means is typically flexible transversely in relation to the longitudinal direction or circumferential direction of the working means. The direction transverse to the working direction is therefore preferably suitable for the excitation and/or propagation of an oscillation, particularly preferably for the formation and propagation of transversal forms of oscillation.

Preferably, the actuator may act, at least indirectly, on the side of a flat form of the working means on one side and/or both sides. This may take place at the center and/or off-center. Alternatively, the actuator may act at least indirectly, preferably by way of a working means guide, on the non-sawing side toward the rear of the working means. It is also conceivable that the at least one actuator acts on the working means at least in the working means, on the working means holder, on the working means guide, on the baseplate of the power tool, on a free end of the working means, or at some other advantageous location of the power tool transversely in relation to the working direction. In this case, the excitation may take place at single locations or multiple locations in combination, so that ideally a constant oscillation is produced and/or maintained in a specific manner in the working means. In an advantageous way, the design strength of the flexible working means is increased by the oscillation and misaligned running of the working means in the workpiece is made more difficult or prevented.

Furthermore, it is proposed that the at least one actuator may be electromagnetically, piezoelectrically, mechanically, hydraulically or pneumatically driven. For example, this actuator is configured as a linear motor or linear adjusting element. A rotatably driven eccentric disk is likewise conceivable. This is typically supported on the housing and acts periodically, at least indirectly, on the working means. A pneumatically or hydraulically driven cylinder or else a mechanical element that serves as an actuator is similarly conceivable. Particularly preferably, the actuator is a piezo actuator. It may advantageously be operated in a low- to high-frequency range. Moreover, the piezo actuator is robust with respect to dust, scarcely susceptible to wear and can be easily connected and controlled electronically. This allows a piezo actuator to be adapted relatively easily to different working means that are used for machining different materials. This adaptation applies in particular to the frequency and amplitude of the actuator, which should ideally be made to suit the working means. Advantageously, the actuator is fed by the same energy source as the driving machine.

Furthermore, at least one actuator that acts in or on the working means is envisaged. Acting "in" the working means is understood as meaning at least an actuator that is arranged within the working means and is connected thereto with positive, frictional, nonpositive or material-bonding engagement. This may for example be a piezo actuator that is pressed in and/or cemented in a holder of the working means with frictional and/or positive and/or material-bonding engagement. The actuator can be advantageously made to suit the respective working means optimally and be introduced, molded onto or in some other way connected to the working means at low cost already in the production process of the working means. Furthermore, by means of contact locations intended for the purpose, the actuator can be electrically connected easily, and ideally in a standardized manner, to the power tool, and thereby connected thereto in a controllable manner.

Acting "on" the working means should be understood as meaning at least an actuator that in principle acts at any desired location of the working means for forming an oscillation in the working means. This is preferably a location at which the working means can be easily excited. For example, the actuator may act on the working means at or close to the working means holder and/or working means guide. This advantageously dispenses with the need for a complex supplementing and/or retaining structure for fastening the at least one actuator. Moreover, standardization, in particular without manual adjustment or adaptation of the actuator to the working means, is advantageous.

Furthermore, it is proposed that the at least one actuator and/or the working means guide driven thereby and/or working means holder are designed in such a way that they can be displaced in an oscillating manner transversely in relation to the working direction. A working means guide is typically a means that is made to suit the properties and dimensions of the working means and guides it on both sides and/or centrally, for example in the form of jaws, pins, rollers, webs or rails. In the case of a jigsaw, saber saw or band saw, it may for example be a system of jaws, or brackets or rollers, in the case of a jigsaw in particular at least one roller lever. For example in the case of a jigsaw, this system may at the same time also act for the purpose of exciting a swinging movement of the working means in the working direction. Moreover, the working means guide typically serves for damping uncontrolled oscillation or juddering and/or misaligned running of the working means that is sometimes flexible and/or restrained only at one end. In the case of a chainsaw, the working means guide typically takes the form of the bar of the saw on which a chain circulates. The working means holder may be understood as meaning, for example in the case of the jigsaw or saber saw, at least the chuck for holding the working means. In the case of the band saw or chainsaw, this holder usually performs the task of the deflecting and/or driving roller or pulley, which typically can also tension the working means, in order for example thereby to prevent the working means from juddering in an uncontrolled manner and/or jumping out. The oscillating displacement of the working means, the working means guides and/or working means holders transversely in relation to the working direction by means of the actuator consequently allows an oscillation to be produced and/or maintained in the working means advantageously and in an easy way.

It is also proposed that the at least one actuator can be manually and/or automatically switched on and off. This is preferably realized manually by the user using an operator control element. This operator control element is preferably arranged on the housing of the power tool. This advantageously enables the user to optionally use the specific formation of an oscillation in the working means with the stated advantages. In case of need, switching on and off may also take place automatically. In case of need should preferably define cases of need at least when cutting along a curve, when the workpiece is particularly hard or thick, when the working means threatens to become jammed or when there is misaligned running of the working means in the workpiece, as well as other cases of need familiar to a person skilled in the art. The power tool can automatically detect these cases of need itself, preferably by means of a sensor. As a consequence, the aforementioned undesired states are counteracted by switching on the at least one actuator.

It is also proposed that a sensor system in the drive unit, or the drive force transmission unit, senses an increasing moment of resistance of the working means in the workpiece and automatically switches on the at least one actuator for forming an oscillation in the working means and/or sets it in the intensity of its excitation. In an advantageous way, this offers an additional option that enhances the application benefits, which can extend the possibilities for the use of the power tool, both in manual operation and in particular in semi or fully autonomous operation, and/or improve the sawing result.

In an advantageous embodiment, the at least one actuator of the power tool may be of a controllable design. Controllable should be understood as meaning able to be changed, in particular by a user and/or a controller or automatic system of the power tool. For example, a user, or in particular in the case of a semi or fully automatic power tool the power tool itself, may control the actuator in at least its intensity and/or deflection and/or acceleration and/or speed. A semiautomatic power tool should be understood as meaning a power tool that has for example an automatic cutting line detection and follows it, the cutting line previously having been drawn or projected onto the workpiece to be machined, for example by an operator. The user then only has to guide the power tool, at least approximately, in the working direction; following the exact desired cutting line is undertaken by the power tool itself. In the case of a fully autonomous power tool, the user does not even have to guide the power tool and/or the workpiece. The deflection and/or speed of the actuator should be understood as meaning in particular the amplitude and/or frequency thereof. The drive unit or driving machine or the electric motor of the power tool itself may also be understood as the actuator. In this case, a device of the power tool controls for example a drive torque and/or rotational speed in such a way that a specific oscillation can be obtained in the working means. For example by oscillating the torque and/or a varying increase and/or decrease of the rotational speed or the speed of the driving machine. In an advantageous way, the controllability of the actuator allows a specific oscillation in the working means to be influenced adequately for the situation. Adequately for the situation should be understood as meaning at least in dependence on material or workpiece parameters, the application and the quality requirements for the quality of the cut and/or quality of the surface.

Advantageously, the at least one actuator may be activated in dependence on power tool parameters and/or working means parameters. The power tool parameters may primarily be the driving torque and/or the rotational speed of the drive unit, in particular the rise or fall thereof or the acceleration thereof. Power tool parameters may, however, also be a fall in the cutting movement or the detection of an imminent jamming of the working means. These may be monitored for example by a load sensor integrated in the drive train, an oscillation monitoring sensor, or a power tool monitoring sensor. In principle, forces and moments in and/or on the drive train and/or on the working means of the power tool that are sensed, in particular by means of a sensor, may be understood as control output parameters. Particularly preferably, in the case of special operating situations, for example when cutting along a curve, when workpieces are particularly hard or thick or when the working means threatens to become jammed, the actuator may be activated to counteract the undesired effect or state. In this case, such a special operating situation can be detected for example by way of an applied sensor in the drive train of the power tool, for example on the power tool housing or in the actuator itself. This sensor then transmits an activation signal, for example in the form of an electrical activation, to the actuator, which then counteracts the undesired effect in the way described. Alternatively, an optical, acoustic, tactile and/or other warning or indicating signal familiar to a person skilled in the art may also be emitted to the user. "Emitted" may be understood as meaning for example indicated or made visible or perceptible—acoustically, visually or tactilely. Similarly, the control device of the power tool may receive the signal from the sensor. In response, an oscillation that is advantageous for the special operating situation, for example the achievement of a better cutting result or better progress in the sawing operation, is produced in the working means manually or automatically by activating the at least one actuator. It is similarly conceivable that the at least one actuator is activated by continuous status monitoring of the power tool, the drive train, the working means holder and/or guide, the working means or some other component of the power tool.

It is also proposed that the at least one actuator may be activated in dependence on workpiece properties. Workpiece properties are for example material properties such as the material, strength, fiber structure or else the hardness, density, moisture content, etc. In dependence on these workpiece properties, a different activation of the actuator may be appropriate. Since different working means, in particular saw blades, bands, chains, are used for different materials, such as for example iron, wood, stone or plastic, an excitation of the actuator made to suit the respective working means or the workpiece properties for the production of an oscillation in the working means that is optimal for the respective case of use is advantageous. In the case of working means that can be used universally, an excitation and formation of an oscillation in the working means that is set suitably for the respective workpiece properties is preferably realized, for example by a variation of the deflection and/or frequency of the actuator. In an advantageous way, the power tool according to the disclosure is in this way versatile in the ways in which it can be used.

According to an advantageous embodiment of the power tool according to the disclosure, the at least one actuator may be switched on in dependence on a work situation. Typical work situations are for example cutting along curves, in particular with narrow radii, sawing workpieces that are hard and/or thick, that have a great tendency to become jammed, and/or entail the risk of misaligned running of the working means. Advantageously, the power tool according to the disclosure can cope with these situations without undergoing wear and with a quality of the cut that is improved in comparison with conventional machining by sawing.

The power tool according to the disclosure may be an electrically driven reciprocating saw, preferably a jigsaw or saber saw. Jigsaws and saber saws are typically distinguished by a working means that is restrained at one end and connected to a reciprocating unit. It is typically elongate in its form and at least substantially rectangular in cross section. The first end of the saw blade, which is connected to the reciprocating unit and typically restrained therein, is opposite from a second free end of the saw blade, which protrudes freely out from a footplate of the power tool. The saw blade is moved back and forth in an oscillating manner with respect to a workpiece by a reciprocating unit. Opposite from the working side of the saw blade, which is oriented in the working direction and provided with sawing cutting edges, there lies a rearward side, which is configured as round, beveled or tapering to a point, but typically does not have any sawing cutting edges. A swinging movement brought about by means of a mechanism that swings in an adjustable manner and acts on the rearward side of the saw blade may occur concurrently with the oscillating reciprocating movement of the jigsaw or saber saw. This swinging movement is preferably introduced from a working means guiding unit, which guides at least the rearward, partly also the flat-formed sides of the saw blade typically in a central position. With respect to the saw blade, the guidance may take place laterally and/or rearwardly, for example by way of smooth, sliding surfaces, rollers or pins.

Furthermore, it is proposed that in one embodiment the at least one actuator of the reciprocating saw displaces the working means guide and/or the working means holder in an oscillating manner transversely in relation to the working direction.

This has the effect that a saw blade restrained in the working means holder is displaced transversely in relation to the working direction, and consequently transversely in relation to the lifting or combined lifting/swinging movement. With its inert mass, the saw blade behaves inertly with respect to displacement. This leads to shear stresses when there is excitation transversely in relation to the working direction in the longitudinal direction of the blade, causing oscillations to be produced. Alternatively or in addition, instead of the working means holder, the working means guide may also be displaced in an oscillating manner transversely in relation to the working direction. This displacement is typically performed by the described actuator supported on the housing, the footplate and/or some other component of the power tool. It is advantageous here that a means of the power tool that in any case holds and/or guides the working means is used for producing the oscillations in the working means.

In a development of the disclosure, it is proposed that the at least one actuator may be displaceable rotatably about a vertical axis of the working means. A vertical axis should be understood as meaning in particular the reciprocating axis of the reciprocating saw, on which the working means moves up and down in a substantially oscillating manner. Preferably, the actuator according to the disclosure induces the working means to perform an oscillation about the vertical axis of the working means. As a result, an oscillation forms in the working means about its longitudinal axis or the vertical axis of the reciprocating saw. This oscillation is preferably a self-oscillation and/or harmonic of the working means. Particularly preferably, the oscillations transversely in relation to the longitudinal axis and about the longitudinal axis of the working means occur concurrently in the working means. Consequently, there is a kind of longitudinal and torsional wave occurring concurrently in the working means. The concurrent occurrence may in this case take place by means of at least one actuator, preferably two actuators. Particularly preferably, the actuators are arranged at least in one case transverse to the working direction and at least in one case about the vertical or longitudinal axis of the working means, acting at least indirectly on the working means. Most particularly preferably, these actuators act by way of the working means holder and/or the working means guide. They thereby produce preferably transversal forms of oscillation in the working means. These may form in the longitudinal direction and—in particular simultaneously—about the longitudinal axis. Advantageously, the design strength of the working means is positively influenced, in particular strengthened, by the individual or combined longitudinal and/or torsional oscillations. This in turn increases the certainty that there will be no misaligned running of the working means, in particular during the machining of thick workpieces or the sawing of narrow radii, such as occur for example when cutting along curves. This effect acts particularly advantageously in the case of thin, flexible saw blades, which are increasingly being used for modern jigsaws.

The disclosure is not restricted to the power tool shown in the exemplary embodiments, but rather can be used in the case of all power tools with cutting or sawing tools of a substantially flat form. For example, also in the case of oscillating multi-cutters, such as for example the Bosch GOP 250 CE.

Also proposed is a method for operating a power tool sawing with a working means in a working direction for producing a sawing cut, in particular a portable electrically driven saw, in particular a handheld reciprocating saw in the form of a jigsaw or saber saw, with at least one actuator, oscillations, in particular transversal waves, being produced in the working means by means of an excitation produced by the actuator. This advantageously increases the design strength, in particular stiffness, of the working means, which has a positive effect on working without misaligned running, and improved cutting quality, in particular when there is an increase in the moment of resistance in the workpiece, for example when cutting along a curve, since less material, in particular material close to the surface, is torn out.

In a development of the method according to the disclosure, as a result an effective cutting width $b_{eff}$ with respect to a working means width b can be increased. Consequently, the friction, in particular of the sides of a flat form of the working means against the workpiece, can be reduced. This advantageously allows the machining speed to be increased and the quality of sawing cuts or curved cuts to be improved, in particular for preventing misaligned running of the saw blade.

In addition, in the case of the method according to the disclosure, the oscillations can be formed in the working means by the excitation in such a way that the design strength of the working means is increased. In particular with the concurrent occurrence of oscillations forming in the working means transversely in relation to the working direction and about the vertical axis of the working means, the design strength or stiffness can be increased. As a result, the working means that in itself is flexible becomes more rigid, and is consequently more suitable for example for cuts along curves and/or for machining without misaligned running of in particular thick and/or solid workpieces and materials.

BRIEF DESCRIPTION OF THE DRAWINGS

Exemplary embodiments of the disclosure are represented in the drawings and explained in more detail in the description that follows. The drawings, the description and the claims contain numerous features in combination. A person skilled in the art will expediently also consider the features individually and put them together to form meaningful further combinations.

In the drawings:

FIG. 8 shows a power tool according to the disclosure in the form of a chainsaw, with an actuator according to the disclosure and an integrated sensor for producing and sensing an oscillation in the working means in a schematic representation.

DETAILED DESCRIPTION

Figure 1:
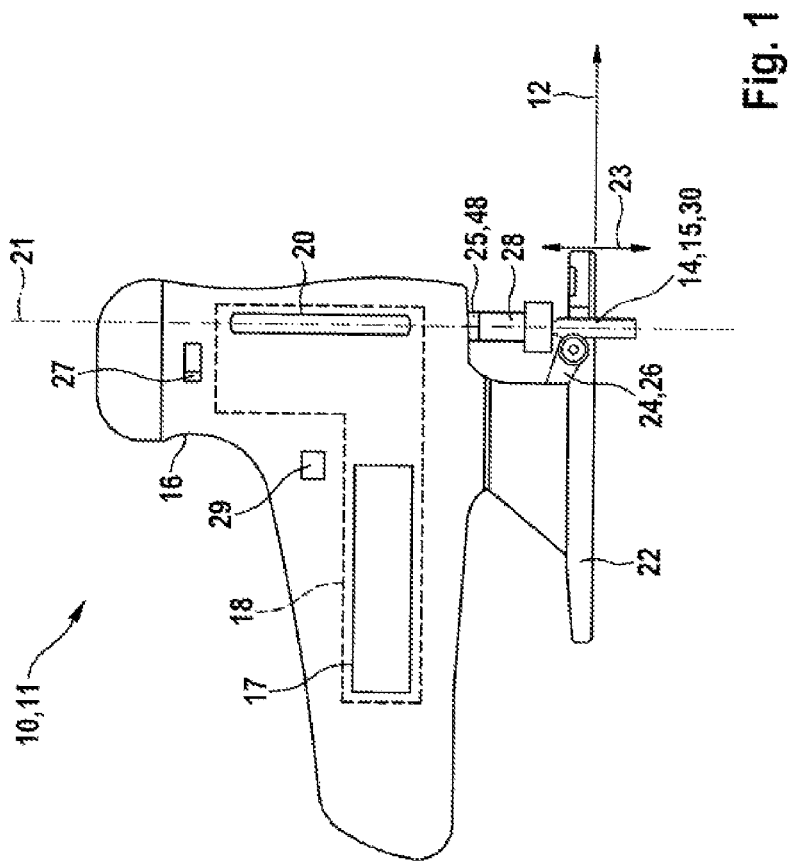
FIG. 1 shows a power tool according to the disclosure in the form of a jigsaw with an actuator according to the disclosure in a schematic representation.

FIG. 1 shows a power tool 10 according to the disclosure as a handheld reciprocating saw 11 in the form of a jigsaw 11, with a working direction 12 and a working means 14 formed as a saw blade 15. The jigsaw 11 typically comprises at least a housing 16, a drive unit 17 and a drive train or drive force transmission mechanism 18, a reciprocating unit 20 and a footplate 22. The working means 14 may be held at least by the reciprocating unit 20. Moreover, it may be moved up and down in an oscillating manner at least in a direction of movement 23. This preferably takes place at least substantially along a reciprocating axis 21. Furthermore, a working means guide 24 in the form of a roller lever 26 guides the working means 14. The reciprocating unit 20 comprises at least a working means holder 28. An actuator 48 according to the disclosure, by way of example with an integrated sensor 25, in particular an oscillation sensor, serves for producing an oscillation in the saw blade (not represented any more specifically here). For this purpose, the actuator may be controlled by means of an operator control element 27 or automatically by an open-loop or closed-loop control 29.

Figure 2:
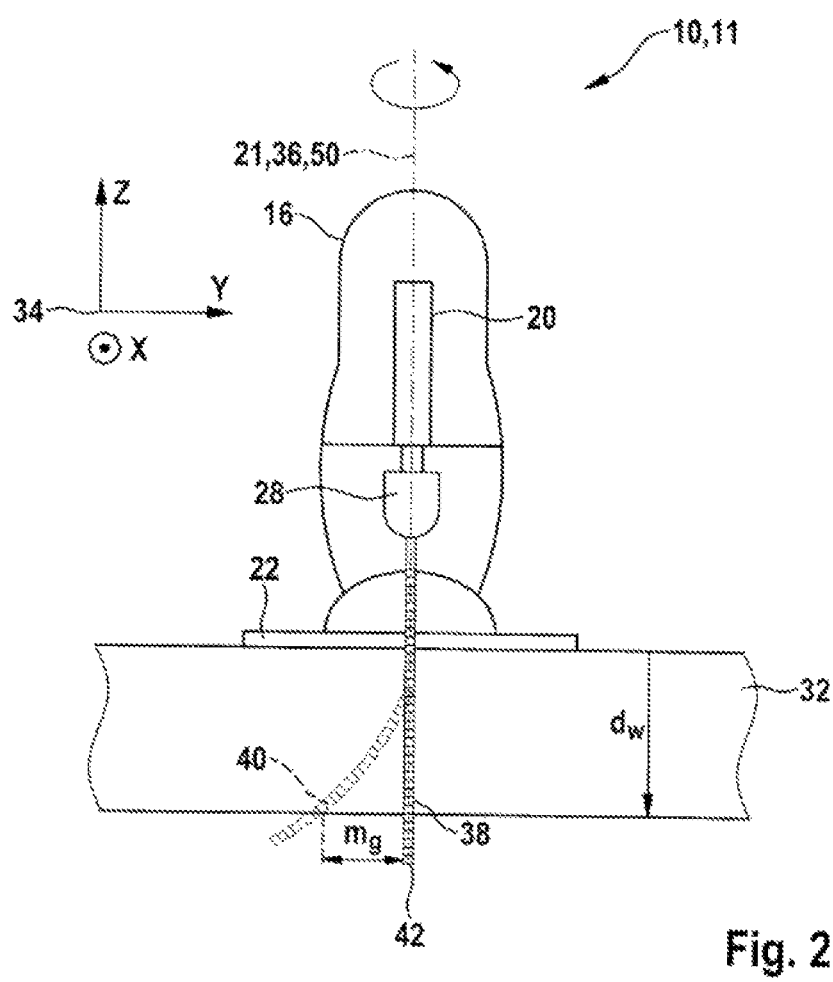
FIG. 2 shows a further schematic view of a power tool in the form of a jigsaw on a workpiece, during a sawing working process, the working means being depicted schematically in an unformed state and an undesired misaligned state.

FIG. 2 shows a further schematic view of the jigsaw 11. This saw rests with its footplate 22 on a workpiece 32. The housing 16, the saw blade 15, the reciprocating unit 20, the footplate 22 and the working means holder 28 of the jigsaw 11 are schematically outlined. Moreover, a system of coordinates 34 is likewise depicted for better orientation and definition of three directions. An X axis of the system of coordinates 34 runs in the working direction 12. A Y axis forms an axis transverse to the working direction 12. A Z axis runs in the direction of a vertical axis 36. The reciprocating unit 20 is also oriented in the direction of this vertical axis 36, at least substantially parallel thereto. The vertical axis 36 may also be a central axis 50 and/or the reciprocating axis 21 of the power tool. Furthermore, FIG. 2 schematically shows the saw blade 15 in a substantially undeformed state 38 and a substantially deformed or undesirably misaligned state 40. The state 40 may also be referred to as a bent, typically elastically bent, state. As known to a person skilled in the art, the state 40 preferably occurs when cutting along curves and/or sawing hard and/or thick workpieces, and typically leads to a curved sawing cut, instead of the desired straight sawing cut, in particular when sawing with an increasing workpiece thickness $d_w$. As a result, an increasing dimensional deviation $m_g$ of the sawing cut from the desired position, to be specific the central axis 50, occurs in the direction of a free end 42 of the saw blade 15 during a sawing operation; the sawing cut is "misaligned". The central axis 50 is typically perpendicular to the surface of the workpiece 32 or perpendicular to the footplate 22 resting on the workpiece 32, as long as it is not attempted to achieve a desired oblique cut or undercut of typically 0-±45°.

Figure 3:
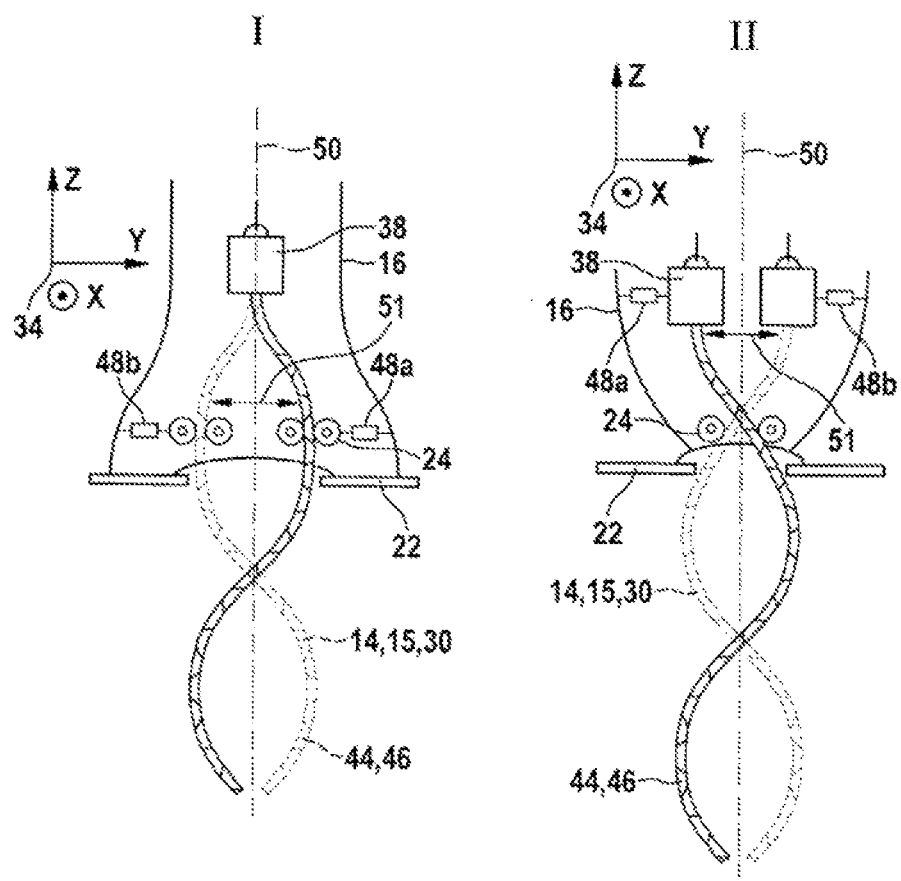
FIG. 3 shows a detail of the power tool from FIG. 2 with an oscillation formed according to the disclosure in the working means and two types of device according to the disclosure for producing this oscillation in a schematic representation.

FIG. 3 shows a detail from FIG. 2 with two actuators 48a, b according to the disclosure, in the form of an electromagnetic linear adjusting element for producing at least one oscillation 44 according to the disclosure (shown with exaggerated amplitude) in the saw blade 15. This oscillation 44 may preferably form in the direction of the Y/Z axis, transversely in relation to the working direction 12 along the saw blade 15. The oscillation represented is preferably a transversal wave 46. Furthermore, FIG. 3 shows two preferred embodiments of the types of device I, II according to the disclosure of the actuator 48 for producing an oscillation in the working means. In case I, two actuators 48a, b are arranged by way of example on either side of the working means guide 24 of the saw blade 15. The actuators 48a, b are supported on the housing 16 of the power tool 10. The actuators 48a, b can displace the saw blade 15 transversely in relation to the working direction 12, and thereby induce it to perform the oscillation 44. For the sustained formation of a preferably transversal oscillation 44, the actuators 48a, b displace the working means guide 24 about the central axis 50 in an oscillating manner according to the marking 51, preferably substantially transversely in relation to the working direction 12. In case II, the actuators 48a, b, displacing transversely in relation to the working direction 12, act on the working means holder 28. This allows the saw blade 15, which is fastened at least to the working means holder 28, to be induced to perform an oscillation 44 forming in the direction of the free end 42. This oscillation is preferably a transversal oscillation about the central axis 50 of the saw blade 15. The at least one actuator 48a, b may preferably also or exclusively turn the saw blade 15 in an oscillating manner about the central axis 50 thereof (cf. FIG. 4c, reference numeral 52). The central axis 50 is oriented at least substantially in the direction of the Z axis and/or the vertical axis 36. This oscillating turning 52 may preferably have the effect that there forms a further concurrently occurring oscillation 54 about the central axis 50 (cf. FIG. 4c).

Figure 4:
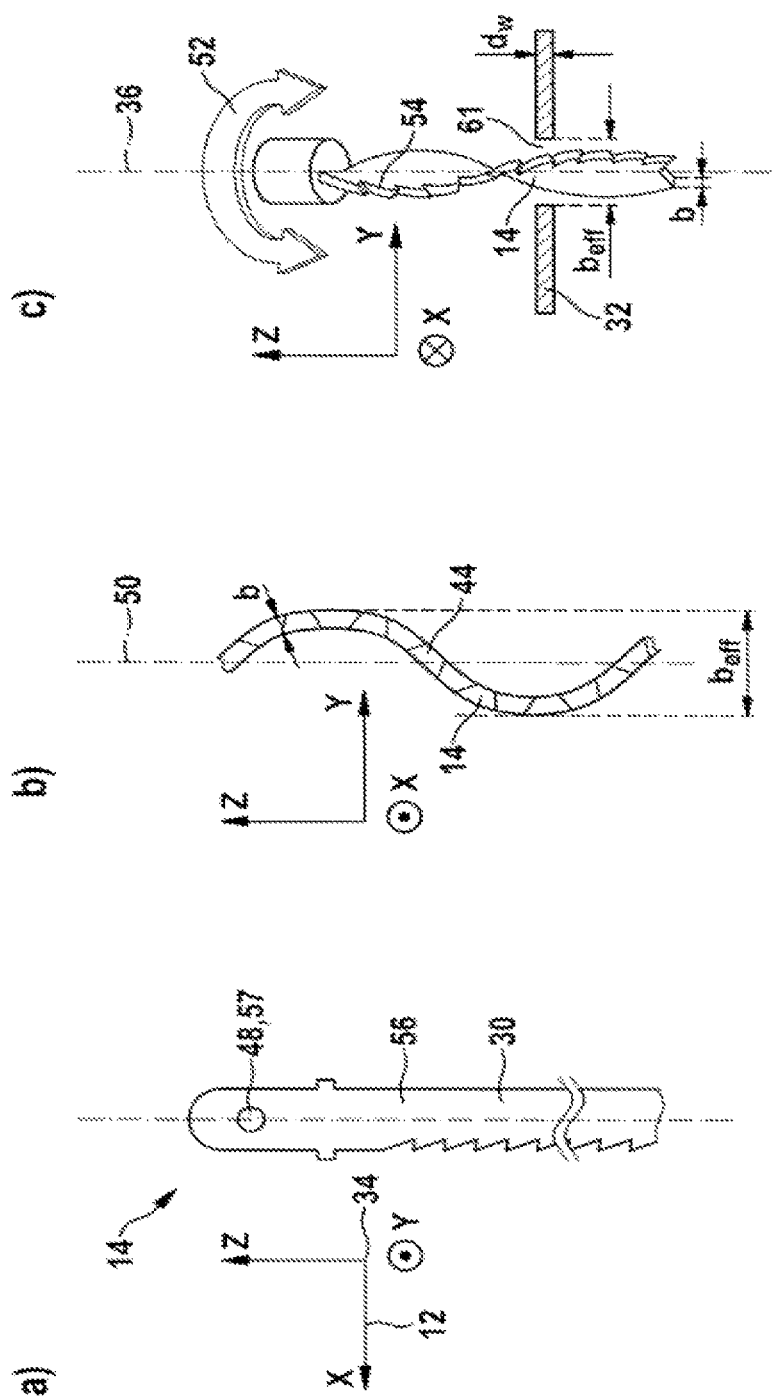
FIG. 4 shows a working means in the form of a jigsaw blade in three schematic views: 4a with an actuator integrated in the working means, 4b and 4c as variants of the oscillation formed according to the disclosure in the working means.

FIG. 4 shows a working means 14, in the form of a jigsaw blade 30 in three schematic views 4a-c. For better orientation, the system of coordinates 34 is likewise depicted. The X axis of the system of coordinates 34 runs in the working direction 12 of the jigsaw blade 30 in the working direction 12 of the power tool 10. The Y axis forms an axis transverse to the working direction 12. The Z axis runs substantially along a longitudinal side of the jigsaw blade 30, or at least parallel to a central axis 50 of the jigsaw blade 30.

View a of FIG. 4 shows a side 56 of a flat form of the jigsaw blade 30, which extends in the direction of the X/Z axis. The actuator 48, which is integrated in or mounted on the jigsaw blade 30, is also represented by way of example in the form of a piezo actuator 57. View b of FIG. 4 shows a according to the disclosure, with the oscillation 44 in the Y/Z direction about the central axis 50 of the oscillating jigsaw blade 30. The jigsaw blade 30 may preferably oscillate with a standing wave, in particular with a transversal wave, in particular with a fundamental-mode and/or harmonic oscillation, about the central axis 50, transversely in relation to the working direction 12. Also depicted are a working means width b and effective cutting width $b_{eff}$. View 4c shows the jigsaw blade 30 in a perspective view. According to the disclosure, the jigsaw blade 30 may oscillate at least with a further and/or alternative oscillation 54, which forms in the working means about the central axis 50 thereof. The at least one further oscillation 54 may be induced by the at least one actuator (not represented any more specifically here), which acts at least indirectly on the jigsaw blade 30, preferably by an oscillating turning of the jigsaw blade 30 about the central axis 50 thereof. The further oscillation 54 is preferably a fundamental-mode and/or harmonic oscillation of the working means 14. Furthermore, the working means thickness b of the jigsaw blade 30 is represented. During a sawing working operation according to the disclosure with the jigsaw (not represented any more specifically here), the working means thickness b may produce in the workpiece 32 a sawing cut (61) with at least an effective cutting width $b_{eff}$, typically referred to as the effective sawing cutting width.

Figure 5:
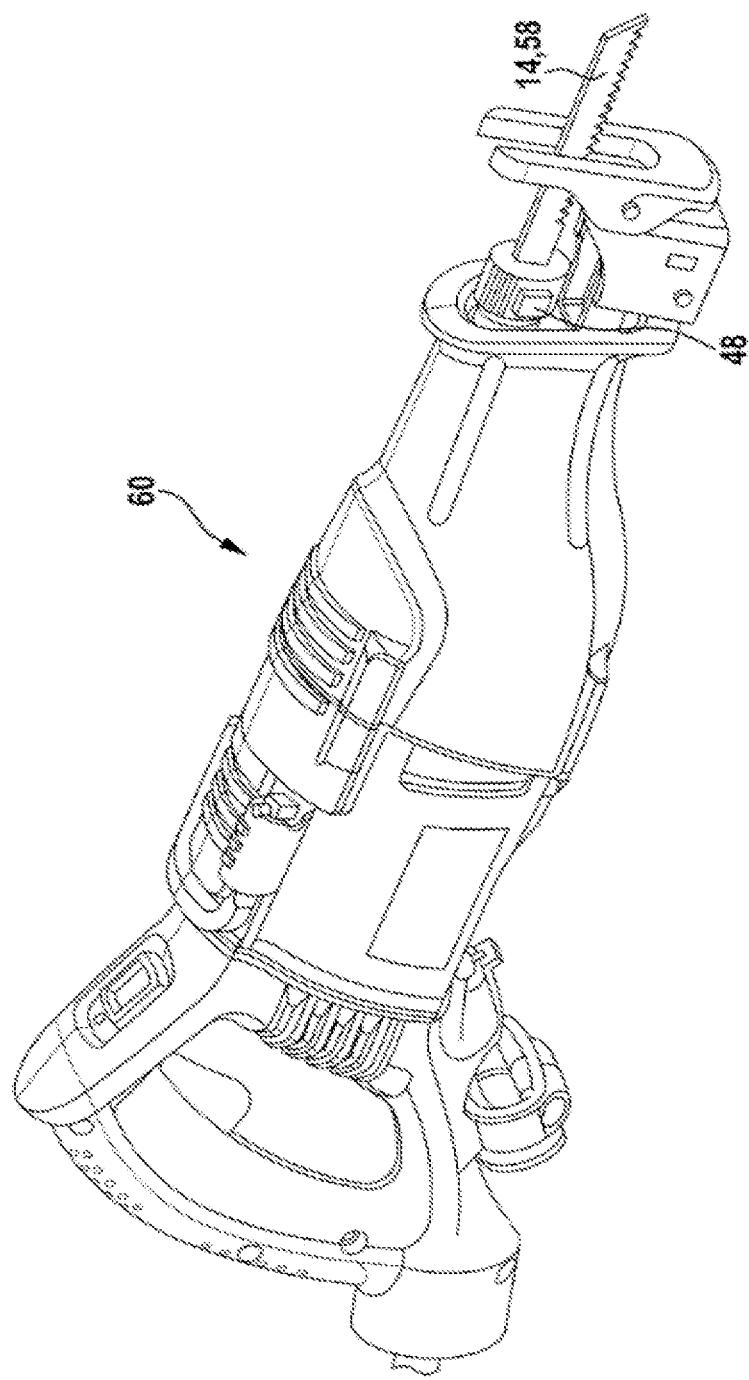
FIG. 5 shows a power tool according to the disclosure in the form of a saber saw, with an actuator according to the disclosure for producing an oscillation in the working means in a schematic representation of an overview.

FIG. 5 shows a power tool according to the disclosure as a reciprocating saw 60 in the form of a saber saw 60, with an actuator 48 according to the disclosure for producing at least one oscillation (not represented any more specifically here) in the working means 14 formed as a saber saw blade 58 in a schematic representation of an overview. The actuator 48 and the oscillations produced may be formed for example as shown in FIGS. 1, 3 and 4, in particular as shown in FIG. 4b, c.

Figure 6:
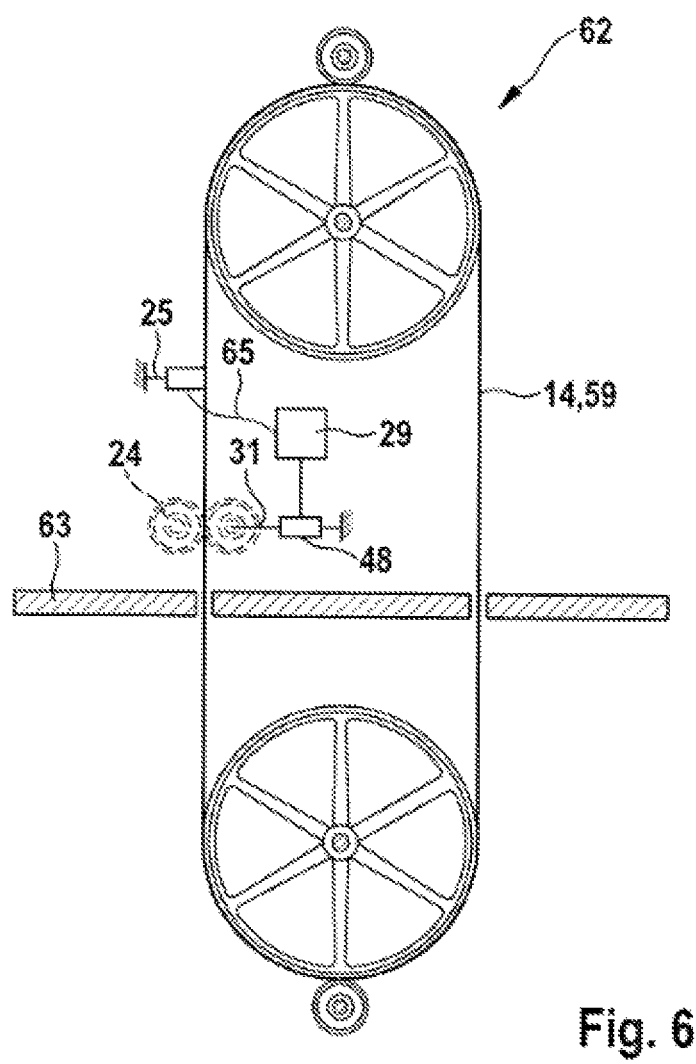
FIG. 6 shows a power tool according to the disclosure in the form of a band saw with an actuator according to the disclosure for producing an oscillation in the working means in a schematic representation.

FIG. 6 shows a power tool according to the disclosure in the form of a band saw 62, with the actuator 48 according to the disclosure for producing at least one oscillation (cf. in particular FIG. 4c, c) in the working means 14 formed as a band saw blade 59 in a schematic representation. A sensor 25, fastened to a surrounding structure (not represented any more specifically here) and intended for sensing the oscillation (cf. in particular FIG. 4b,c) in the band saw blade 59 is connected to a closed-loop or open-loop control 29 by way of a transmission line 65. The closed-loop or open-loop control 29 controls the actuator 48 by way of an activating signal. The actuator can moreover be switched on/off manually and/or automatically. The actuator 48 is preferably connected to a working means guide 24. A working table 63 of the band saw 62 is also depicted.

Figure 7:
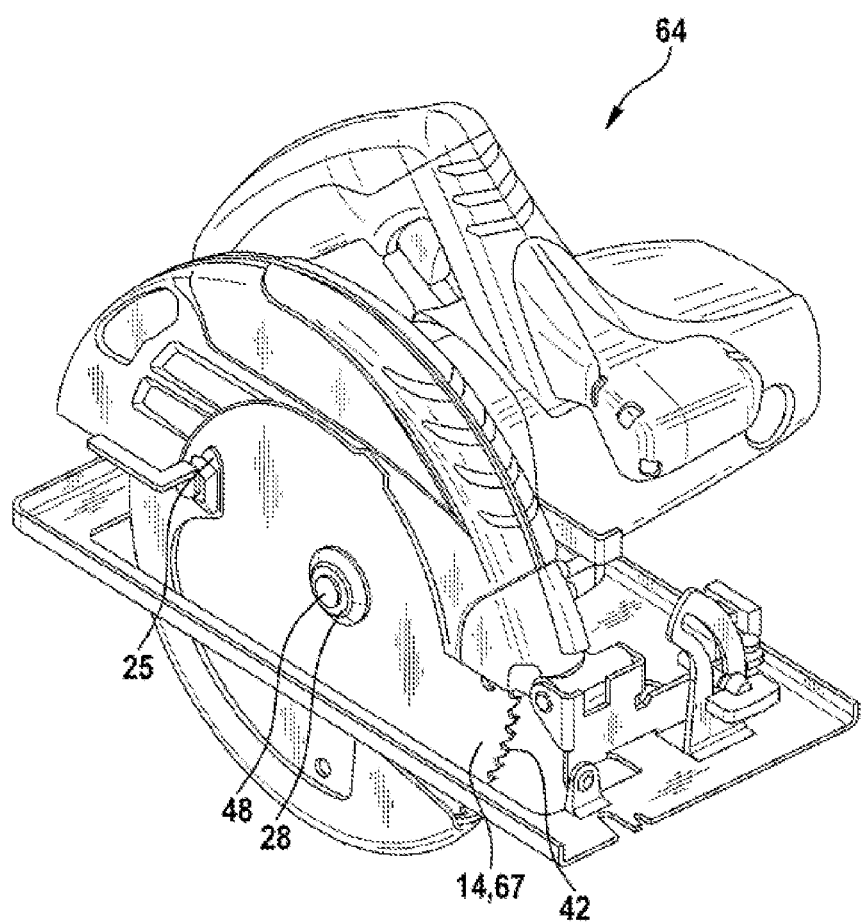
FIG. 7 shows a power tool according to the disclosure in the form of a circular saw with an actuator according to the disclosure for producing an oscillation in the working means and a sensor for the sensing thereof in a schematic representation.

FIG. 7 shows a power tool according to the disclosure in the form of a circular saw 64 with an actuator 48 according to the disclosure for producing at least the oscillation (not represented any more specifically here) in the working means 14, formed as a circular saw blade 67, and a sensor 25 for sensing the at least one oscillation in a schematic representation. The at least one actuator 48 is provided for producing transversal forms of oscillation (in particular by analogy with FIG. 4b, c), in particular transversal waves in the circular saw blade 67. Transversal forms of oscillation are waves where an oscillation takes place transversely in relation to the direction of propagation of the wave. The propagation typically emanates from the source of excitation, preferably the point of action of the at least indirectly acting actuator 48. The oscillations 44 or 54 preferably emanate from the point of action of the actuator 48 radially in the direction of a free end 42 of the circular saw blade 67, or in the circumferential direction of the working means 14, in the circular saw blade 67.

FIG. 8 shows a power tool according to the disclosure in the form of a chainsaw 66, with the actuator 48 according to the disclosure and a sensor 25 integrated therein for producing and sensing at least one oscillation (not represented any more specifically here) in the working means 14 formed as a chain 68, in a schematic representation. In the case of the chainsaw 66, the bar 70 of the chainsaw 66 represents the working means guide 24, on which the chain 68 circulates. The complete unit at least comprising the sawing chain 68 and the bar-like working means guide 24, 70 can in this case be considered as a working means 14 of a flat form. By an oscillating displacement of the bar 70 together with the chain 68 transversely in relation to the working direction 12, represented by way of example, by means of the actuator 48, an oscillation (cf. FIG. 4b, c) can be produced and/or maintained in the working means 14.

What is claimed is:

1. A power tool, comprising:
   a sawing working device having an at least partially flat form that defines a blade plane, the sawing working device configured to produce a sawing cut in a working direction;
   a drive unit that moves the sawing working device within the blade plane; and
   at least one actuator configured to produce at least one oscillation in the sawing working device such that at least a portion of the sawing working device flexes out of the blade plane.

2. The power tool according to claim 1, wherein the at least one actuator is further configured to produce transversal forms of oscillation in the sawing working device.

3. The power tool according to claim 1, wherein the at least one actuator produces oscillations in the sawing working device transversely in relation to the working direction of the sawing working device.

4. The power tool according to claim 1, wherein the at least one actuator is electromagnetically driven, piezoelectrically driven, mechanically driven, hydraulically driven, or pneumatically driven.

5. The power tool according to claim 1, wherein the at least one actuator acts in or on the sawing working device.

6. The power tool according to claim 1, further comprising one or more of a working device guide driven by the at least one actuator and a working device holder, wherein one or more of the at least one actuator, the working device guide, and the working device holder are configured to be displaced in an oscillating manner transversely in relation to the working direction.

7. The power tool according to claim 1, wherein the at least one actuator is configured to be switched on and off manually or automatically.

8. The power tool according to claim 1, wherein the at least one actuator is configured to be controlled manually or automatically.

9. The power tool according to claim 1, further comprising:
   a controller configured to selectively activate the actuator to produce the oscillation in sawing working device; and
   at least one sensor configured to detect at least one operating state of the power tool related to one or more of power tool parameters, working device parameters, and workpiece properties,
   wherein the controller is configured to activate the actuator in dependence on the detected operating state.

10. The power tool according to claim 1, wherein:
   the sawing working device has an effective cutting width that is variable between a first effective cutting width and a second effective cutting width, the first effective cutting width substantially equals a working device width of the sawing working device when the actuator does not produce the at least one oscillation, and the second effective cutting width is (i) greater than the first effective cutting width when the actuator produces the at least one oscillation and (ii) configured to be adjusted by the oscillation produced in the sawing working device by the actuator.

11. The power tool according to claim 1, wherein the power tool is configured as a handheld reciprocating saw.

12. The power tool according to claim 11, wherein the at least one actuator is displaceable rotatably about a vertical axis of the sawing working device.

13. A method for operating a power tool, comprising:
sawing with a sawing working device in a working direction to produce a sawing cut, the sawing working device (i) having an at least partially flat form that defines a blade plane and (ii) moved by a drive unit within the blade plane; and
generating oscillations in the sawing working device by an excitation produced by at least one actuator, the oscillations flexing at a least a portion of the sawing working device out of the blade plane.

14. The method according to claim 13, further comprising generating via the excitation an effective cutting width of the power tool that is greater than a working device width of the sawing working device in a direction that is normal to the blade plane.

15. The method according to claim 13, wherein the excitation by the actuator forms transversal oscillations in the sawing working device that vary an effective strength of the sawing working device from a first effective strength without the transversal oscillations to a second effective strength with the transversal oscillations, the second effective strength greater than the first effective strength.

16. The method according to claim 13, further comprising:
detecting at least one operating state of the power tool related to one or more of power tool parameters, working device parameters, and workpiece properties; and
selectively activating the actuator to produce the oscillation in the sawing working device in dependence on the detected operating state.

17. The power tool according to claim 2, wherein the transversal forms of oscillation in the sawing working device are transversal waves.

18. The power tool according to claim 11, wherein the handheld reciprocating saw is configured as a jigsaw or a saber saw.

19. The method according to claim 13, wherein the power tool is configured as a handheld reciprocating saw, and wherein the oscillations are configured as transversal waves.

20. The power tool according to claim 17, wherein the transversal waves propagate in the sawing working device from a point of cooperation with the actuator in a direction towards a free end of the sawing working device.

* * * * *